United States Patent
McCullough

(10) Patent No.: US 7,860,969 B2
(45) Date of Patent: *Dec. 28, 2010

(54) METHOD FOR CONTINUOUS, FRAME-SPECIFIC CLICK-STREAM RECORDING

(75) Inventor: Sean M. McCullough, Austin, TX (US)

(73) Assignee: Vignette Software LLC, Austin, TX (US)

(*) Notice: Subject to any disclaimer, the term of this patent is extended or adjusted under 35 U.S.C. 154(b) by 994 days.

This patent is subject to a terminal disclaimer.

(21) Appl. No.: 11/601,357

(22) Filed: Nov. 17, 2006

(65) Prior Publication Data

US 2007/0067454 A1    Mar. 22, 2007

Related U.S. Application Data

(63) Continuation of application No. 09/681,758, filed on May 31, 2001, now Pat. No. 7,155,506.

(60) Provisional application No. 60/208,889, filed on Jun. 2, 2000, provisional application No. 60/208,890, filed on Jun. 2, 2000.

(51) Int. Cl.
*G06F 15/173* (2006.01)

(52) U.S. Cl. .................. 709/224; 709/223; 707/1; 707/101; 707/102

(58) Field of Classification Search .......... 709/223, 709/224; 705/14; 707/1, 101, 102
See application file for complete search history.

(56) References Cited

U.S. PATENT DOCUMENTS

| | | | |
|---|---|---|---|
| 4,754,428 A | 6/1988 | Schultz et al. | |
| 4,811,207 A | 3/1989 | Hikita et al. | |
| 5,210,824 A | 5/1993 | Putz et al. | |
| 5,212,787 A | 5/1993 | Baker et al. | |
| 5,226,161 A | 7/1993 | Khoyi et al. | |
| 5,257,369 A | 10/1993 | Skeen et al. | |
| 5,331,673 A | 7/1994 | Elko et al. | |
| 5,339,392 A | 8/1994 | Risberg et al. | |
| 5,421,015 A | 5/1995 | Khoyi et al. | |
| 5,572,643 A | 11/1996 | Judson | |

(Continued)

OTHER PUBLICATIONS

Kitts, "An Evaluation of Customer Retention and Revenue Forecasting in the Retail Sector: Investigation into the Effects of Seasonality, Spending and Method" by DataSage, Inc., 63 pages, Oct. 25, 1999.

(Continued)

*Primary Examiner*—Nathan Flynn
*Assistant Examiner*—Mohammad A Siddiqi
(74) *Attorney, Agent, or Firm*—Sprinkle IP Law Group

(57) ABSTRACT

A data processing system-implemented method can be used to better track a user's movements between network addresses. The method can comprise sending a frame identifier and a requested (current) network address at a first time. The method can also comprise finding a record including the frame identifier that has a prior network address and a time prior to the current time. The method can further comprise generating an entry for a table that includes the frame identifier, the current network address, the prior network address, and time. A server computer or a client computer can generate the entry. Improved accountability and improved user profile accuracy can be obtained with the method. A data processing system readable medium can comprise code that includes instructions for carrying out the method.

35 Claims, 5 Drawing Sheets

U.S. PATENT DOCUMENTS

| | | | |
|---|---|---|---|
| 5,704,017 | A | 12/1997 | Heckerman et al. |
| 5,727,129 | A | 3/1998 | Barrett et al. |
| 5,732,218 | A | 3/1998 | Bland et al. |
| 5,740,430 | A | 4/1998 | Rosenberg et al. |
| 5,761,416 | A | 6/1998 | Mandal et al. |
| 5,774,660 | A | 6/1998 | Brendel et al. |
| 5,790,426 | A | 8/1998 | Robinson |
| 5,790,790 | A | 8/1998 | Smith et al. |
| 5,796,952 | A | 8/1998 | Davis et al. |
| 5,870,559 | A | 2/1999 | Leshem et al. |
| 5,878,223 | A | 3/1999 | Becker et al. |
| 5,884,282 | A | 3/1999 | Robinson |
| 5,918,014 | A | 6/1999 | Robinson |
| 5,958,008 | A | 9/1999 | Pogrebisky et al. |
| 5,991,735 | A | 11/1999 | Gerace |
| 6,012,052 | A | 1/2000 | Altschuler et al. |
| 6,035,332 | A | 3/2000 | Ingrassia et al. |
| 6,041,311 | A | 3/2000 | Chislenko et al. |
| 6,049,777 | A | 4/2000 | Sheena et al. |
| 6,067,565 | A | 5/2000 | Horvitz |
| 6,085,226 | A | 7/2000 | Horvitz |
| 6,092,049 | A | 7/2000 | Chislenko et al. |
| 6,094,662 | A | 7/2000 | Hawes |
| 6,112,279 | A | 8/2000 | Wang |
| 6,128,655 | A | 10/2000 | Fields et al. |
| 6,138,141 | A | 10/2000 | DeSimone et al. |
| 6,141,737 | A | 10/2000 | Krantz et al. |
| 6,151,622 | A | 11/2000 | Fraenkel et al. |
| 6,185,586 | B1 | 2/2001 | Judson |
| 6,185,608 | B1 | 2/2001 | Hon et al. |
| 6,741,967 | B1 | 5/2004 | Wu et al. |
| 6,996,612 | B1 | 2/2006 | McCullough |
| 7,155,506 | B1 * | 12/2006 | McCullough ............... 709/224 |
| 2002/0013834 | A1 | 1/2002 | Esakov et al. |
| 2002/0062252 | A1 | 5/2002 | Van Zoest et al. |
| 2002/0152237 | A1 | 10/2002 | Cohen et al. |

OTHER PUBLICATIONS

Kitts, "RMS Revenue and Retention Forecasting Final Phase Model Specification" by DataSage, Inc., 16 pages, Jan. 31, 2000.
Discount Store News, "DataSage Customer Analyst", 1998.
Montgomery, et al., "Estimating Price Elasticities with Theory-Based Priors," J. Marketing Research, vol. 36, pp. 413-423, 1999.
Simon, "Price Management," Elsevier Sci. Pub., pp. 13-41, 1989.
Subrahmanyan and Shoemaker, "Developing Optimal Pricing and Inventory Policies for Retailers Who Face Uncertain Demand," J. Retailing, vol. 72, pp. 7-30, 1996.
Vilcassim and Chintagunta, "Investigating Retailer Product Category Pricing from Household Scanner Panel Data," J. Retailing, vol. 71, pp. 103-128, 1995.
Weinstein, "Tackling Technology," Progressive Grocer, 1999.
Wellman, "Down in the (Data) Mines," Supermarket Business, pp. 33-35, 1999.
RT News, "New Customer Management System Returns Lost Sales to Dick's," RT Magazine, 1999.
DataSage, Inc., "DataSage Customer Analyst," Progressive Grocer, 1998.
Miller, "Applications Integration-Getting It Together," PC Magazine, pp. 111-112, 116-120, 136, 138, Feb. 8, 1994.
PointCast 2.0 Eases Burden on Network, 3 pp, Jun. 2, 1997.
Strom, "The Best of Push," 7 pp, Apr. 1997.
When Shove Comes to Push, 5 pp, Feb. 10, 1997.
thirdvoice.com-Home Page and Frequently Asked Questions (7 pp) www.thirdvoice.com, www.thirdvoice.com/help.20/faq.htm, 2000.

* cited by examiner

METHOD FOR CONTINUOUS, FRAME-SPECIFIC CLICK-STREAM RECORDING

CROSS REFERENCE TO RELATED APPLICATIONS

This application is a continuation of, and claims a benefit of priority under 35 U.S.C. 120 of the filing date of U.S. patent application Ser. No. 09/681,758, now U.S. Pat. No. 7,155,506, by inventor Sean M. McCullough entitled "METHOD FOR CONTINUOUS, FRAME-SPECIFIC CLICK-STREAM RECORDING" filed on May 31, 2001, which in turn claims the benefit of priority under 35 U.S.C. §119 to provisional patent application No. 60/208,889 entitled "METHOD FOR CLICK-STREAM ANALYSIS USING WEB DIRECTORY REVERSE CATEGORIZATION" by McCullough filed Jun. 2, 2000, and U.S. Patent Application No. 60/208,890 entitled "METHOD FOR CONTINUOUS, FRAME-SPECIFIC CLICK-STREAM RECORDING" by McCullough filed Jun. 2, 2000. This is also related to U.S. patent application Ser. No. 09/681,760, now U.S. Pat. No. 7,251,687, entitled "METHOD FOR CLICK-STREAM ANALYSIS USING WEB DIRECTORY REVERSE CATEGORIZATION" by McCullough filed of even date. All applications listed in this paragraph are assigned to the current assignee hereof and are incorporated herein by reference.

BACKGROUND OF INVENTION

1. Field of the Invention

This invention relates in general to methods and data processing system readable media, and more particularly, to methods of tracking movement between network addresses and data processing system readable media for carrying out those methods.

2. Description of the Related Art

Internet Service Providers ("ISPs") and others may track Uniform Resource Locators (URLs) from a user by creating a table including a user identifier, the requested URL, and a timestamp. This method of recording can give a chronological sequence of URLs for the user. A problem with this chronological listing is that it may not accurately show the URL from which the user requested the current URL. This can be important where compensation between parties depends on the originating (source) URL and the current (destination) URL. Because an accurate listing all of this movement may not be possible, the parties may dispute how much money, if any, one company owes the other company. An accurate list may be needed for other purposes, such as creating user profiles and the like.

SUMMARY OF INVENTION

A data processing system-implemented method can be used to better track a user's movements between network addresses. A frame identifier can be used to help track the movements. A table can be generated that may include entries comprising a frame identifier, current network address, prior network address, time, and potentially other information. The improved accuracy of the movements allows better accountability between companies for financial arrangements regarding links to each other's network sites and allows for more accurate user profiles to be created.

In one set of embodiments, a data processing system-implemented method of tracking movement between network addresses can comprise receiving a first frame identifier and a first network address at a first time. The method can also comprise finding a record including the first frame identifier, a second network address, and a second time. The second time may precede the first time. The method can further comprise generating an entry for a table that includes the first frame identifier, the first network address, the second network address, and a third time.

In another set of embodiments, a data processing system-implemented method of tracking movement between network addresses can comprise displaying a first view to a user. The first view may include a first frame having a first frame identifier and a second frame having a second frame identifier. The method can also comprise receiving a first request for a first network address from the user. The first request can be generated by the user activating a first object within the first frame. The method can further comprise sending the first frame identifier and the first network address at a first time. The method can yet further comprise finding a record including the first frame identifier, a second network address, and a second time. For the first frame identifier, the second time may precede the first time. The method can still further comprise generating a first entry for a table that includes the first frame identifier, the first network address, the second network address, and a third time.

In still other embodiments, a data processing system readable medium can have code embodied within it. The code can include instructions executable by a data processing system. The instructions may be configured to cause the data processing system to perform the methods described herein.

The foregoing general description and the following detailed description are exemplary and explanatory only are not restrictive of the invention, as claimed.

BRIEF DESCRIPTION OF DRAWINGS

The present invention is illustrated by way of example and not limitation in the accompanying figures, in which like references indicate the same elements, and in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Reference is now made in detail to the exemplary embodiments of the invention, examples of which are illustrated in the accompanying drawings. Wherever possible, the same reference numbers will be used throughout the drawings to refer to the same or like parts (elements).

A data processing system-implemented method can be used to better track a user's movements between network addresses. The method can comprise sending a frame identifier ("ID") and a requested (current) network address at a first time. The method can also comprise finding a record including the frame identifier that has a prior network address and a time prior to the current time. The method can further comprise generating an entry for a table that includes the frame identifier, the current network address, the prior network address, and time. Improved accountability and improved user profile accuracy may be obtained with the method. A data processing system readable medium can comprise code that includes instructions for carrying out the method.

A few terms are defined or clarified to aid in understanding the descriptions that follow. A network includes an interconnected set of server and client computers over a publicly available medium (e.g., the internet) or over an internal (company-owned) system. A user at a client computer may gain access to the network using a network access provider. An Internet Service Provider ("ISP") is a common type of network access provider. A network address includes information that can be used by a server computer to locate information, whether internal to that server computer or at a different, remote computer or database. URLs are examples of network addresses. A network site corresponds to a location specified by a network address. A web site is a common type of network site. Note that the examples given within this paragraph are for purposes of illustration and not limitation. Regarding ownership and control, a first party significantly owns or controls a second party or property if the second party is an employee of the first party or if the first party owns or controls (as determined by the voting percentage or number of voting shares) at least 20 percent of the second party or property.

Figure 1:
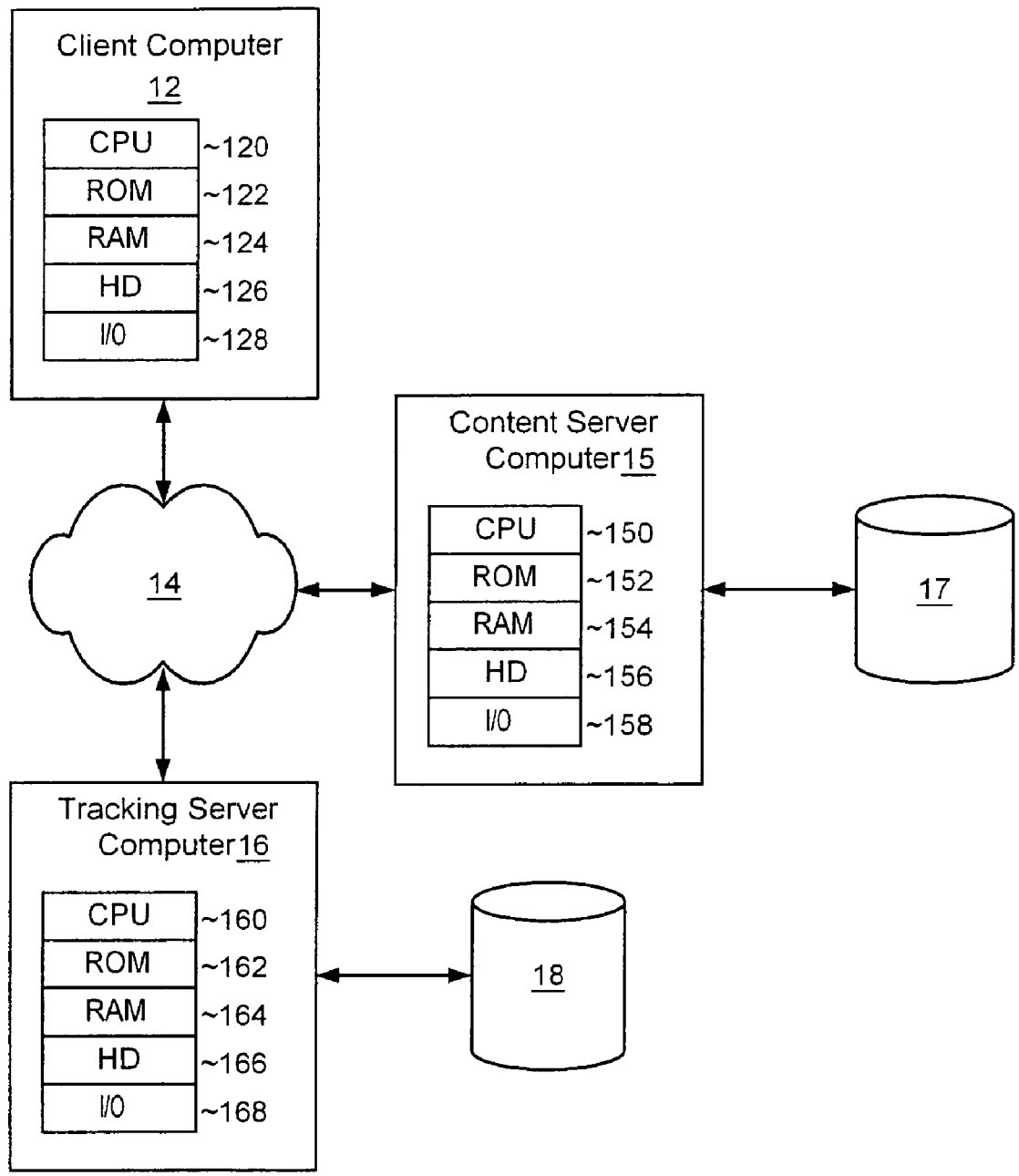
FIG. 1 includes an illustration of a hardware architecture for carrying out methods of tracking movement between network addresses.

Before discussing details of embodiments of present invention, a hardware architecture for using embodiments is described. FIG. 1 illustrates an exemplary architecture and includes a client computer 12 that is bi-directionally coupled to a network 14, and a tracking server computer 16 that is bi-directionally coupled to the network 14 and database 18. A content server computer 15 is bi-directionally coupled to the network 14 and database 17. The client computer 12 includes a central processing unit ("CPU") 120, a read-only memory ("ROM") 122, a random access memory ("RAM") 124, a hard drive ("HD") or storage memory 126, and input/output device(s) ("I/O") 128. The I/O devices 128 can include a keyboard, monitor, printer, electronic pointing device (e.g., mouse, trackball, etc.), or the like. The content server computer 15 can include a CPU 150, ROM 152, RAM 154, HD 156, and I/O 158, and the tracking server computer 16 can include a CPU 160, ROM 162, RAM 164, HD 166, and I/O 168.

Each of the client computer 12 and the server computers 15 and 16 is an example of a data processing system. ROM 122, 152, and 162, RAM 124, 154, and 164, HD 126, 156, and 166, and the databases 17 and 18 include media that can be read by the CPU 120, 150, or 160. Therefore, each of these types of memories includes a data processing system readable medium. These memories may be internal or external to the computers 12, 15, and 16.

Figure 2:
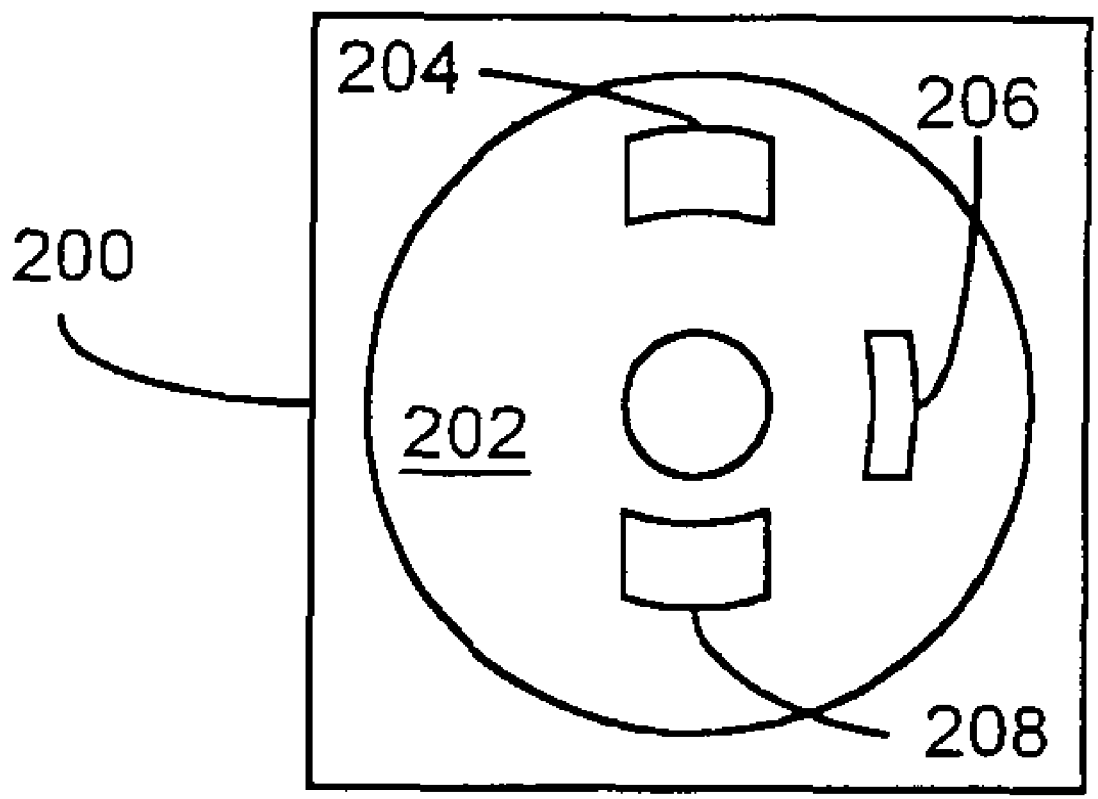
FIG. 2 includes an illustration of a data processing system readable medium including software code.

The methods described herein may be implemented in suitable software code that may reside within ROM 122, 152, or 162, RAM 124, 154, or 164, or HD 126, 156, or 166. FIG. 2 illustrates a combination of software code elements 204, 206, and 208 that are embodied within a data processing system readable medium 202 on storage device 200, such as a hard drive. In addition to those types of memories previously described, the instructions in an embodiment of the present invention may be contained on a data storage device with a different data processing system readable storage medium. The instructions may be stored as software code elements on a DASD array, magnetic tape, floppy diskette, electronic read-only memory, optical storage device, CD ROM or other appropriate data processing system readable medium or storage device.

Figure 3A:
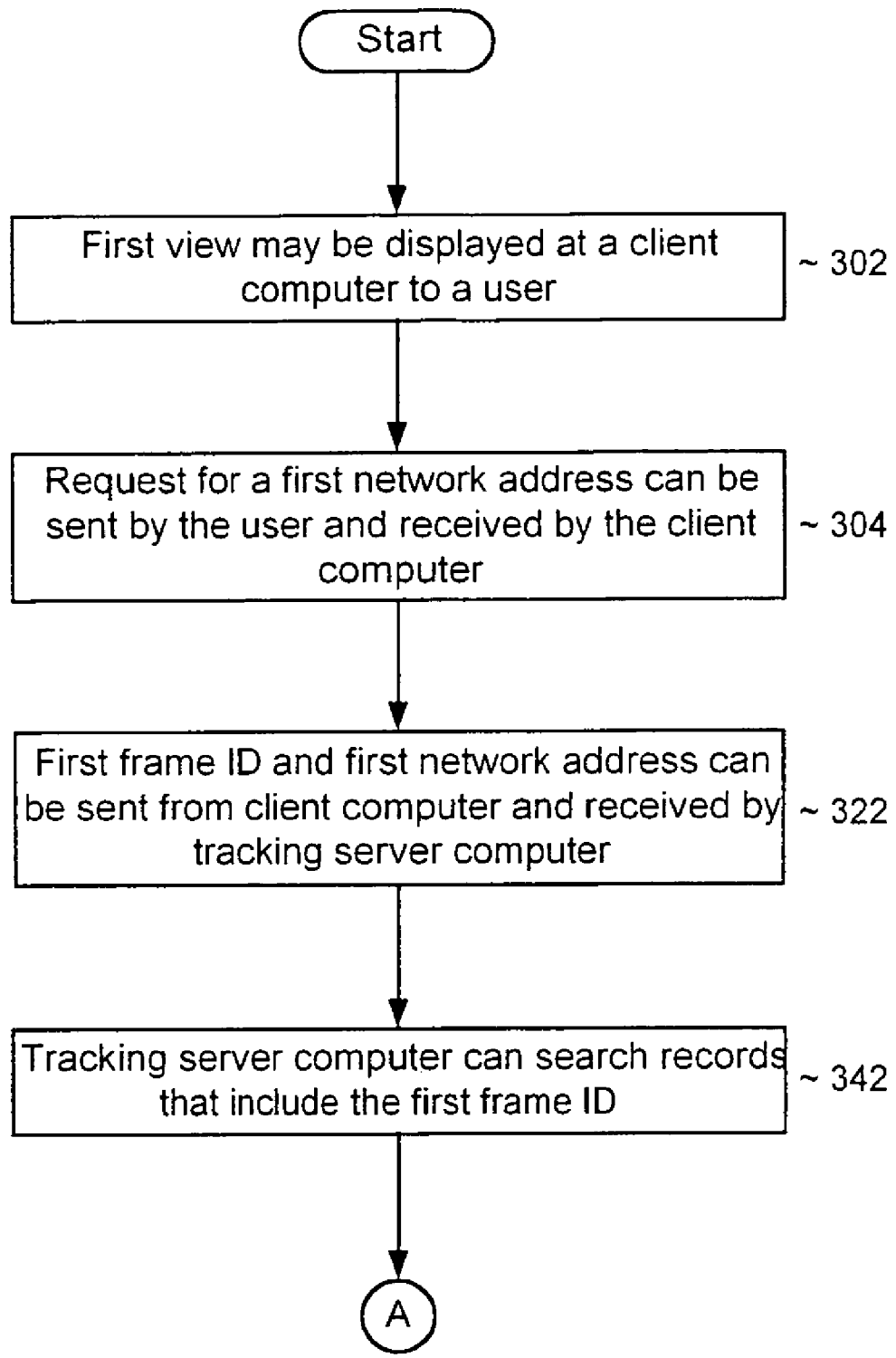
FIGS. 3A and 3B include a process flow diagram illustrating a method of tracking movement between network addresses.
Figure 3B:
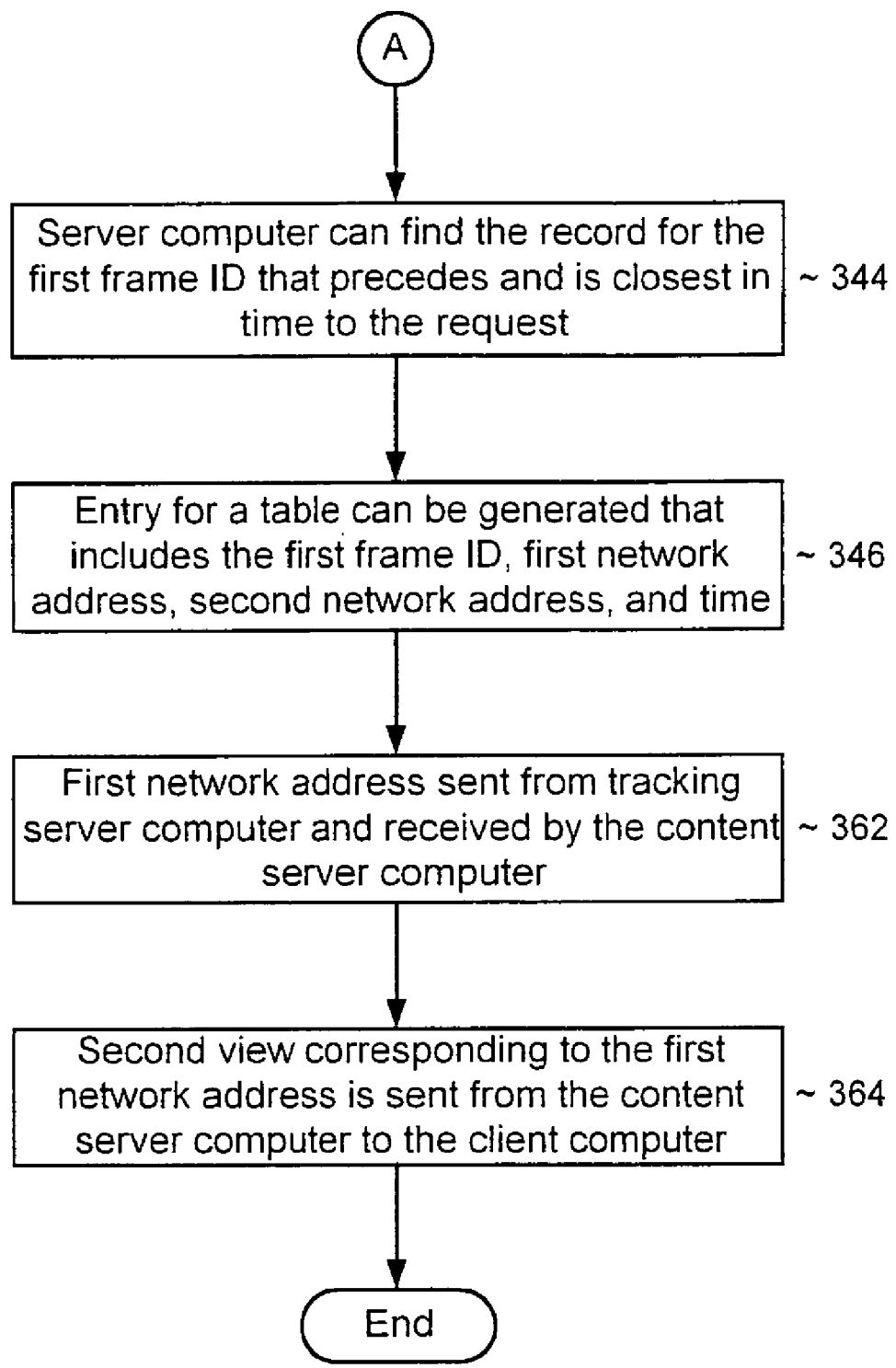

In an illustrative embodiment of the invention, the computer-executable instructions may be lines of compiled C++, Java, or other language code. Other architectures may be used. For example, the functions of the client computer 12 may be incorporated into the tracking server computer 16, and vice versa. Likewise, the functions of the tracking server computer 16 may be incorporated into the content server computer 15, and vice versa. More or fewer server computers can be used. FIGS. 3A and 3B include an illustration, in the form of a flow diagram, of the structure of such a software program.

Communications between the client computer 12 and the server computers 15 and 16 can be accomplished using radio frequency, electronic, or optical signals. When a user (human) is at the client computer 12, the client computer 12 may convert the signals to a human understandable form when sending a communication to the user and may convert input from the user to appropriate signals to be used by the client computer 12 or the server computers 15 or 16.

Figure 4:
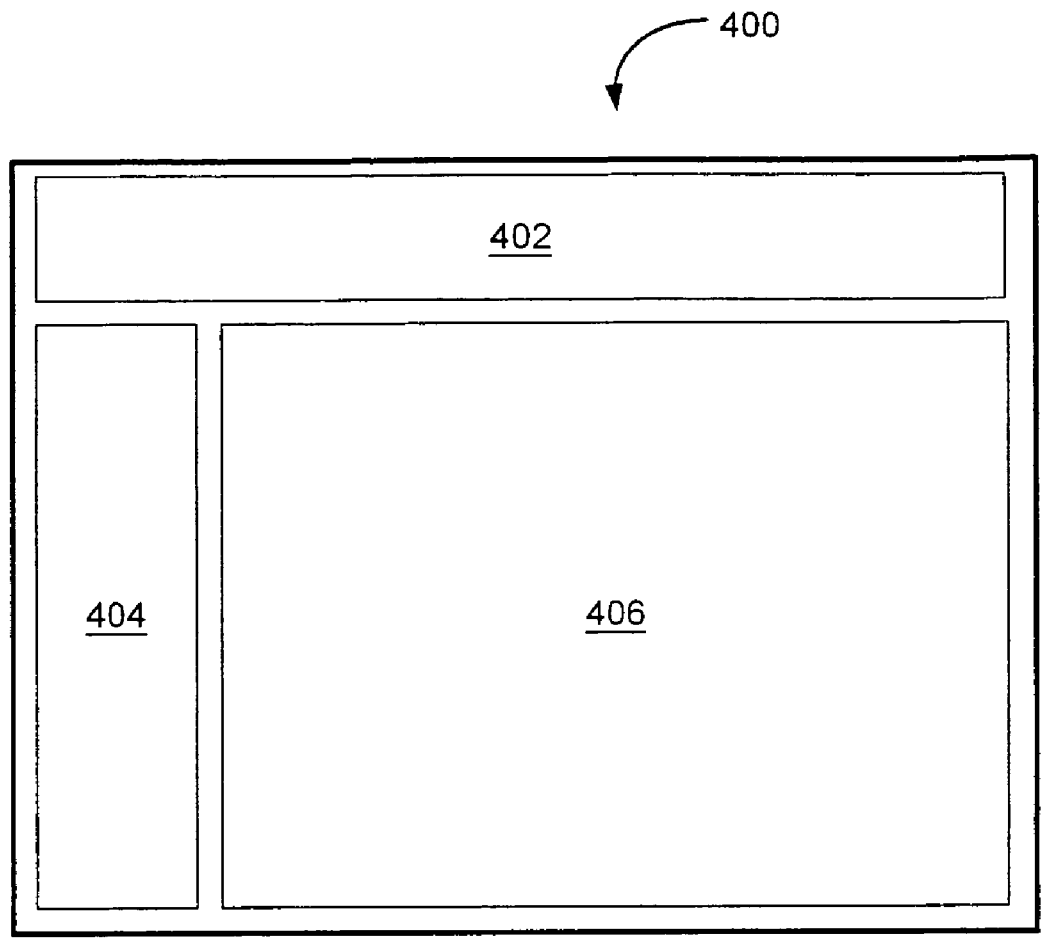
FIG. 4 includes an illustration of a view with frames displayed to a user.

Attention is now directed to a method for tracking movement between network addresses as illustrated in FIGS. 3A and 3B. A first view may be displayed at the client computer 12 to a user as illustrated in block 302 of FIG. 3A. For example, the user may see view 400 as shown in FIG. 4. View 400 may include a browser control section 402, a first frame 404, and a second frame 406. The browser control section 402 can include icons and pull-down menus to allow a user to move forward, backward, home, adjust preferences, or perform other functions with the browser. The first frame 404 may include a navigation bar or a set of advertisements, and the second frame 406 can include a body of the view 400. The first frame 404 and the second frame 406 may include icons, hyperlinks, or other similar objects that can be activated by the user to go from a current network address to a different network address. As shown in FIG. 4, the first frame 404 may have one network address, the second frame 406 may have another network address, and the composite view 400 may include yet another network address.

As previously stated, the route used by a user to reach a network address may have financial implications. The user may be able to access a network address from each of the first frame 404 and the second frame 406. In one example, assume that the first frame 404 has advertisements for products or services of one company ("advertising company"), and the second frame 406 represents the information from a company that controls the content server computer 15 ("content company"). If the user accesses a network address using a link or other object within second frame 406, the advertising company may not owe any money to the content company. However, if the user accesses a network address using frame 404, the advertising company may owe fee to the content company. Therefore, identifying the frame and sequence of network addresses using that frame may have financial implications. Clearly, other business arrangements are possible.

A request for a first network address from a first frame 404 can be sent from the user and received by the client computer 12 as shown in block 304 in FIG. 3A. The request can be made when the user (at client computer 12) activates an icon, a link, or other similar object within the first frame 404 by use of an electronic pointing device, such as a mouse, a trackball, or the like. A signal, which may include a first frame ID for the first frame 404 and the first network address can be sent from the client computer 12 and received by the tracking server computer 16 (block 322) via network 14.

The tracking server computer 16 can search records that include the first frame identifier (block 342). In one embodiment, the records can reside within a table in database 18. The records may be organized in rows and columns. The rows may correspond to each instance of a network address request. The columns may correspond to different fields including frame identifier, prior (originating or source) network address, current (destination) network address, time (e.g., timestamp or other temporal information), and the like. Optionally, a user identifier may be included as a field.

After locating the records for the same frame identifier, the tracking server computer 16 can find the record that immediately precedes (before and closest in time to) the request (block 344 in FIG. 3B). The tracking server computer 16 can generate an entry for the table that may include the first frame identifier (for frame 404), the first (current) network address that corresponds to the request, the immediately preceding (second) network address for that same frame identifier, and a timestamp or other temporal information (block 346). The timestamp or other temporal information may be substantially the same time at which the signal is sent from the client computer 12 to the tracking server computer 16 regarding the request. Usually, the time difference between the timestamp and the time the client computer 12 sends the first frame ID and first network address to the server computer 16 is no more than one minute. In this manner, a table is created that includes the current and prior network addresses to more accurately track the movement of the user from one network address to another network address for a specific frame identifier.

The first network address can be sent from the tracking server computer 16 to the content server computer 15 as shown in block 362. This may be performed at the same time or just before or after the actions in blocks 322, 342, 344, and 346 are performed. The content server computer 15 may access database 17 to obtain information related to the first network address.

A second view (not shown) corresponding to the first network address can be sent from the content server computer 15 over network 14 to the client computer 12. The view may be displayed on the I/O 128 at client computer 12 for the user to see or print. The time for performing the acts within the method can be performed relatively quickly. Therefore, the method may be transparent to the user because he or she may see little time lapse between requesting a network address can seeing the corresponding view for that network address.

The method may continue with the user requesting to be sent back to view 400. In this instance, the user may be re-displayed view 400. The user may decide to originate a request for a network address from frame 406 (second frame) instead of from frame 404. The method can proceed in a similar manner as the request that was made from frame 404. The user would make a request for a new network address from frame 406. The client computer 12 can send a signal to the tracking server computer 16 via the network 14 that would include the frame identifier for frame 406 and the network address being requested from frame 406. The tracking server computer 16 can find the immediately preceding record with that same frame identifier. An entry in a table can be generated by server computer 16 including the second frame identifier for frame 406, the current network address, the prior network address, and a different timestamp compared to the timestamp for the first frame identifier request. The second network address may be sent from the tracking computer 16 and received by the content server computer 15. The content server computer 15 may send and the client computer 12 may receive a view corresponding to the network address as requested from frame 406 for the user at client computer 12 to see or print.

Figure 5:
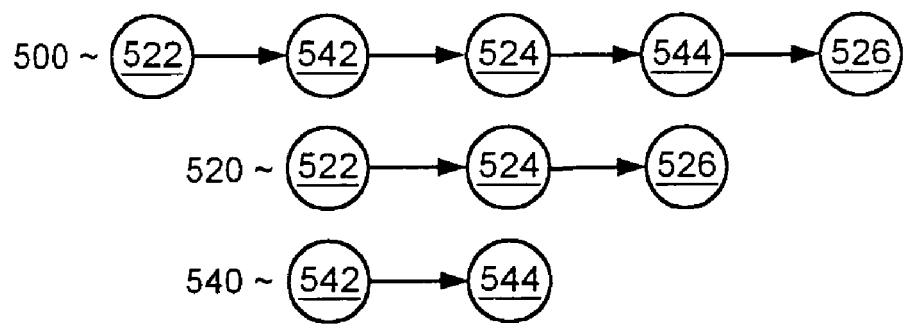
FIG. 5 includes an illustration of a node diagram shown a sequence of network addresses accessed by the user.

After data in the table has been collected, a node diagram can be created that tracks the movement of the user at one frame when moving from one network address to another. FIG. 5 includes node diagrams to better illustrate the movement within frames. String 500 includes of chronological node diagram for the user at client computer 12. Each node represents a network address. As can be seen, the user requested network address 522 first, network address 542 second, network address 524 third, network address 544 fourth, and network address 526 fifth. From this diagram, one may conclude that the user went from network address 522 to network address 542, but this may not be the case.

String 520 may illustrate a sequence of network addresses that originated from frame 404 but not frame 406, and string 540 may illustrate a sequence of network addresses that originated from frame 406 but not frame 404. Because the user may switch between frames, the order in string 500 does not represent the manner in which the user went from network address to network address for a specific frame. As shown in string 520, the user may have accessed network address 524 directly from network address 522 as shown in string 520, and not from network address 542 as shown in string 500. Similarly, the user may have accessed network address 544 directly from network address 542 as shown in string 540, and not from network address 524 as shown in string 500. Clearly, strings 520 and 540 more accurately reflect the movement of the user between network addresses from specific frames. When financial arrangements or a user profile depend on this tracking information, the accurate tracking movement between network addresses is needed. Activity statements can be generated that indicate that a sequence of network addresses was activated from the various frames.

The method works substantially the same if the user has more than one copy of a browser application open at client computer 12. Each copy may have its own frame identifier, as generated by client computer 12. Instead of having different frames (404 and 406) in a single window, the frames are in different windows.

While much of the discussion has focused on the tracking server computer 16, at least a portion of the method may alternatively be performed by the client computer 12 in assembling information for the table. For example, a table may reside within HD 126 of client computer 12. The client computer 12 may create the table with the frame identifier, current network address, prior network address, and timestamp. The information within the table on client computer 12 may be downloaded to a larger table within the database 18 via tracking server computer 16 or other location external to client computer 12 on a periodic or other basis.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A data processing system-implemented method of tracking movement between network addresses comprising:
   receiving, at a first time at a tracking server, a request for a first network address from a client computer, wherein the first network address is from a first frame provided to the client computer by a content server, wherein the request contains a first frame identifier for the first frame, and wherein the content server and the client computer are coupled to the tracking server via a network;
   finding a record in a database accessible by the tracking server, wherein the record comprises the first frame identifier, a second network address from the first frame provided to the client computer by the content server, and a second time, wherein the second time precedes and is temporally closest to the first time, wherein the finding is performed using the tracking server; and
   generating an entry for a table in the database that includes the first frame identifier, the first network address, the second network address, and a third time, wherein the generating is performed using the tracking server.

2. The method of claim 1, wherein the first time and the third time are substantially same or close in time.

3. The method of claim 1, further comprising sending a view from the content server to a user at the client computer before the receiving step, wherein the view includes the first frame and a second frame having a second frame identifier.

4. The method of claim 3, further comprising generating a node diagram illustrating a sequence of network addresses that originated from the first frame but not the second frame.

5. The method of claim 1, further comprising, in response to the receiving step, the content server sending a view corresponding to the first network address to the client computer that requested the first network address.

6. The method of claim 1, further comprising generating a statement of activity, wherein:
   the first network address is significantly owned or controlled by a first party;
   the second network address is significantly owned or controlled by a second party;
   the first party is not significantly owned or controlled by the second party, and the second party is not significantly owned or controlled by the first party; and
   the statement indicates that a sequence of network addresses was activated from the first frame.

7. The method of claim 1, wherein:
   the request from the client computer further comprises a user identifier; and
   the second time is closest in time to the first time for the user identifier and the first frame identifier.

8. A data processing system-implemented method of tracking movement between network addresses comprising:
   displaying a first view to a user at a client computer, wherein the first view includes a first frame having a first frame identifier and a second frame having a second frame identifier;
   receiving, at a first time at a tracking server, a first request for a first network address from the user at the client computer, wherein the first request is generated by the user activating a first object within the first frame;
   in a database accessible by the tracking server, searching records that include the first frame identifier for the first frame, wherein the searching is performed using the tracking server;
   from the records that have the same first frame identifier, finding a record in the database accessible by the tracking server, wherein the record comprises the first frame identifier, a second network address from the first frame provided to the client computer by a content server, and a second time, wherein, for the first frame identifier, the second time precedes the first time; and
   generating a first entry for a table in the database that includes the first frame identifier, the first network address, the second network address, and a third time, wherein the finding and generating are performed using the tracking server.

9. The method of claim 8, wherein the first time and the third time are substantially same or close in time.

10. The method of claim 8, further comprising displaying a second view corresponding to the first network address to the user.

11. The method of claim 8, wherein the second time is closest in time to the first time for the first frame identifier.

12. The method of claim 8, further comprising:
   receiving a second request for a third network address from the user at the client computer, wherein the second request is generated by the user activating a second object within the second frame;
   sending the second frame identifier and the third network address at a fourth time to the tracking server;
   finding a record in the database having the second frame identifier, a fourth network address, and a fifth time, wherein, for the second frame identifier, the fifth time precedes and is closest in time to the fourth time; and
   generating a second entry for the table in the database that includes the second frame identifier, the third network address, the fourth network address, and a sixth time.

13. The method of claim 8, wherein the tracking server receives the first request for the first network address over a network from the client computer.

14. The method of claim 13, further comprising:
   sending the first view comprising the first frame and the second frame from the content server to the client computer over the network;
   receiving the first network address from the tracking server at the content server; and
   sending a second view based on the first network address and the first frame identifier from the content server to the client computer over the network.

15. A tangible non-transitory data processing system readable storage medium having code embodied therein, the code including instructions executable by a data processing system, wherein the instructions are configured to cause the data processing system to perform:
   receiving, at a tracking server at a first time, a request for a first network address from a client computer, wherein the first network address is from a first frame provided to the client computer by a content server, and wherein the request contains a first frame identifier for the first frame;
   finding a record in a database accessible to the tracking server, wherein the record comprises the first frame identifier, a second network address from the first frame provided to the client computer by the content server, and a second time, wherein the second time precedes the first time, wherein the tracking server performs the finding; and generating an entry for a table in the database that includes the first frame identifier, the first network address, the second network address, and a third time, wherein the tracking server performs the generating.

16. The tangible non-transitory data processing system readable storage medium of claim 15, wherein the first time and the third time are substantially same or close in time.

17. The tangible non-transitory data processing system readable storage medium of claim 15, wherein the instructions are configured to further cause the data processing system to perform:

sending a view from the content server to a user at the client computer before the receiving step, wherein the view includes the first frame and a second frame having a second frame identifier.

18. The tangible non-transitory data processing system readable storage medium of claim 17, wherein the instructions are configured to further cause the data processing system to perform:

generating a node diagram illustrating the sequence of network addresses that originated from the first frame but not the second frame.

19. The tangible non-transitory data processing system readable storage medium of claim 15, wherein the instructions are configured to further cause the data processing system to perform:

in response to the receiving step, sending a view corresponding to the first network address to the client computer that requested the first network address.

20. The tangible non-transitory data processing system readable storage medium of claim 15, wherein the instructions are configured to further cause the data processing system to perform:

generating a statement of activity, wherein:
the first network address is significantly owned or controlled by a first party;
the second network address is significantly owned or controlled by a second party;
the first party is not significantly owned or controlled by the second party, and the second party is not significantly owned or controlled by the first party; and
the statement indicates that a sequence of network addresses was activated from the first frame.

21. The tangible non-transitory data processing system readable storage medium of claim 15, wherein:
the request from the client computer further comprises a user identifier; and
the second time is closest in time to the first time for the user identifier and frame identifier.

22. A tangible non-transitory data processing system readable storage medium having code embodied therein, the code including instructions executable by a data processing system, wherein the instructions are configured to cause the non-transitory data processing system to perform:

displaying a first view to a user at a client computer via a browser application running on the client computer, wherein the first view includes a first frame having a first frame identifier and a second frame having a second frame identifier;

receiving, at a first time at a tracking server, a first request for a first network address from the user at the client computer, wherein the first request is generated by the user activating a first object within the first frame;

in a database accessible by the tracking server, searching records that include the first frame identifier for the first frame, wherein the searching is performed using the tracking server;

from the records that have the same first frame identifier, finding a record in the database accessible by the tracking server, wherein the record comprises the first frame identifier, a second network address from the first frame provided to the client computer by the content server, and a second time, wherein, for the first frame identifier, the second time precedes the first time; and generating a first entry for a table in the database that includes the first frame identifier, the first network address, the second network address, and a third time, wherein the tracking computer performs the generating.

23. The tangible non-transitory data processing system readable storage medium of claim 22, wherein the first time and the third time are substantially same or close in time.

24. The tangible non-transitory data processing system readable storage medium of claim 22, wherein the instructions are configured to further cause the data processing system to perform:

displaying a second view corresponding to the first network address to the user.

25. The tangible non-transitory data processing system readable storage medium of claim 22, wherein the second time is closest in time to the first time for the first frame identifier.

26. The tangible non-transitory data processing system readable storage medium of claim 22, wherein the instructions are configured to further cause the data processing system to perform:

receiving a second request for a third network address from the user at the client computer, wherein the second request is generated by the user activating a second object within the second frame;

sending the second frame identifier and the third network address at a fourth time to the tracking server;

finding a record in the database having the second frame identifier, a fourth network address, and a fifth time, wherein, for the second frame identifier, the fifth time precedes and is closest in time to the fourth time; and generating a second entry for the table in the database that includes the second frame identifier, the third network address, the fourth network address, and a sixth time.

27. A system comprising:
a client computer configured to request content over a network and provide views to a user;
a tracking computer coupled to the client computer by the network, the tracking computer comprising a processor and at least one tangible non-transitory data processing system readable storage medium storing computer instructions; and
a database accessible by the tracking computer;
wherein the tracking computer is configured to:
receive a request for a first network address at a first time over the network based on a view request made at the client computer, wherein the first network address is from a first frame within the views, wherein the request contains a first frame identifier for the first frame;
in a database accessible by the tracking server, search records that include the first frame identifier for the first frame;
find a record in the database, wherein the record comprises the first frame identifier, a second network address, and a second time, wherein the second time precedes the first time; and generate an entry in the database that includes the first frame identifier, the first network address, the second network address, and a third time.

28. The system of claim 27, further comprising a content server configured to:

receive the first network address from the tracking server; and return content to the client computer over the network, wherein the content is based on the first network address.

29. The system of claim 27, wherein the tracking computer receives the first frame identifier and the first network address from the client computer.

30. The system of claim 27, wherein the tracking computer is further configured to:

receive a second frame identifier, a third network address and a fourth time based on a subsequent view request made at the client computer;

find a record in the database having the second frame identifier, a fourth network address, and a fifth time, wherein for the second frame identifier, the fifth time precedes and is closest in time to the fourth time;

generate a second entry for the table in the database that includes the second frame identifier, the third network address, the fourth network address and a sixth time.

31. A computer program product comprising at least one tangible non-transitory data processing system readable storage medium storing a set of instructions executable to perform:

providing a receiving element, a record finding element and a database modification element running on one or more computers;

receiving a first frame identifier and a first network address at a first time over a network, where in the receiving is performed by the receiving element;

finding a record in a database accessible by a tracking server, wherein the record comprises the first frame identifier, a second network address, and a second time, wherein the second time precedes the first time, wherein the finding is performed using the tracking server, wherein the finding is performed by the record finding element using the first frame identifier received using the receiving element; and generating an entry for a table in the database that includes the first frame identifier, the first network address, the second network address, and a third time, wherein the generating is performed using the tracking server, wherein the database modification element performs the generating.

32. The computer program product of claim 31, wherein the first time and the third time are substantially same or close in time.

33. The computer program product of claim 31, wherein the at least one tangible non-transitory data processing system readable storage medium further comprises instructions executable to perform:

sending a view to a user before receiving the first frame and the first network address, wherein the view includes the first frame and a second frame having a second frame identifier.

34. The computer program product of claim 33, wherein the at least one tangible non-transitory data processing system readable storage medium further comprises instructions executable to perform:

providing a node diagram generating element; and generating a node diagram illustrating a sequence of network addresses that originated from the first frame but not the second frame, wherein the generating is performed by the node diagram generating element.

35. The computer program product of claim 31, wherein the at least one tangible non-transitory data processing system readable storage medium further comprises instructions executable to perform:

in response to receiving, sending a view corresponding to the first network address to a computer that requested the first network address.

* * * * *